(12) United States Patent
Posnien

(10) Patent No.: US 9,340,134 B2
(45) Date of Patent: May 17, 2016

(54) VEHICLE SEAT COVER

(75) Inventor: Axel Posnien, Burscheid (DE)

(73) Assignee: Johnson Controls Technology Company, Holland, MI (US)

( * ) Notice: Subject to any disclaimer, the term of this patent is extended or adjusted under 35 U.S.C. 154(b) by 179 days.

(21) Appl. No.: 13/816,611

(22) PCT Filed: May 25, 2011

(86) PCT No.: PCT/EP2011/002595
§ 371 (c)(1),
(2), (4) Date: Feb. 12, 2013

(87) PCT Pub. No.: WO2012/028218
PCT Pub. Date: Mar. 8, 2012

(65) Prior Publication Data
US 2013/0140867 A1    Jun. 6, 2013

(30) Foreign Application Priority Data
Aug. 30, 2010   (DE) .................. 10 2010 035 845

(51) Int. Cl.
*B60N 2/58* (2006.01)
*B60N 2/70* (2006.01)
(52) U.S. Cl.
CPC ............. *B60N 2/58* (2013.01); *B60N 2/5883* (2013.01); *B60N 2/5891* (2013.01); *B60N 2/7017* (2013.01)
(58) Field of Classification Search
CPC ...... B60N 2/58; B60N 2/5883; B60N 2/5891; B60N 2/7017
USPC .................................................... 297/452.62
See application file for complete search history.

(56) References Cited

U.S. PATENT DOCUMENTS

| 2,218,785 | A |   | 10/1940 | Boettcher |
|---|---|---|---|---|
| 2,274,929 | A |   | 3/1942 | Millar |
| 2,782,839 | A | * | 2/1957 | Cole ...................... 297/228.12 |
| 2,960,702 | A |   | 11/1960 | Linke |
| 3,805,717 | A |   | 4/1974 | Gerlach et al. |
| 4,115,170 | A | * | 9/1978 | Sanson ........................ 156/79 |
| 4,384,541 | A |   | 5/1983 | Schneider |
| 4,693,511 | A | * | 9/1987 | Seltzer et al. ............. 297/228.1 |

(Continued)

FOREIGN PATENT DOCUMENTS

| DE | 1529375 |   | 6/1966 |
|---|---|---|---|
| DE | 2023803 | A | 12/1971 |

(Continued)

OTHER PUBLICATIONS

Office Action for Japanese application No. 2013-526330 dated Jun. 24, 2014.

(Continued)

*Primary Examiner* — David R Dunn
*Assistant Examiner* — Tania Abraham
(74) *Attorney, Agent, or Firm* — The Dobrusin Law Firm P.C.

(57) ABSTRACT

The invention relates to a vehicle seat cover with an underlay, a cover and an upholstered element which is provided between the cover and the underlay, wherein the underlay, the cover and/or the upholstered element are connected to one another by means of at least one longitudinal seam and at least one transverse seam. Furthermore, the present invention relates to a method for manufacturing a seat cover, and to a vehicle seat having the seat cover according to the invention.

6 Claims, 6 Drawing Sheets

(56) References Cited

U.S. PATENT DOCUMENTS

| | | | |
|---|---|---|---|
| 4,740,035 A * | 4/1988 | Kazaoka et al. | 297/452.62 |
| 4,747,638 A * | 5/1988 | Saito | 297/452.62 |
| 4,772,070 A * | 9/1988 | Leto et al. | 297/228.12 |
| 5,360,653 A | 11/1994 | Ackley | |
| 5,411,623 A * | 5/1995 | Shutt | 156/290 |
| 5,501,165 A * | 3/1996 | Nagashima | B60N 2/5891 112/132 |
| D400,044 S * | 10/1998 | Rosenberg | D6/611 |
| 6,851,755 B2 * | 2/2005 | Dinkel | A47C 4/54 297/284.3 |
| 6,893,087 B2 * | 5/2005 | Hancock et al. | 297/219.11 |
| 7,172,246 B1 * | 2/2007 | Itakura | 297/219.1 |

FOREIGN PATENT DOCUMENTS

| | | |
|---|---|---|
| DE | 2353489 | 10/1973 |
| DE | 2353489 A | 10/1973 |
| DE | 8811464 | 9/1988 |
| DE | 9401511.2 | 1/1994 |
| DE | 4234547 C1 | 2/1994 |
| DE | 9401511.2 U1 | 5/1994 |
| DE | 29818154 | 10/1998 |
| FR | 1056438 A | 2/1954 |
| GB | 2250432 | 10/1990 |
| GB | 2250432 A | 6/1992 |
| JP | 56-117849 | 2/1955 |
| JP | 60-158499 | 10/1985 |
| JP | 63-196300 | 12/1988 |
| JP | 10-52348 | 2/1998 |
| JP | 10052348 A | 2/1998 |

OTHER PUBLICATIONS

International Search Report for PCT/EP2011/002595 dated Aug. 30, 2010.

German Examination Report dated Aug. 2, 2013.

* cited by examiner

VEHICLE SEAT COVER

CLAIM OF PRIORITY

This application is a national phase filing under 35 USC §371 from PCT Application serial number PCT/EP2011/002595 filed on May 25, 2011, and claims priority therefrom. This application further claims priority from DE 10 2010 035 845.2 filed Aug. 30, 2010 both incorporated herein by reference.

The present invention relates to a vehicle seat cover comprising an underlay, a cover and an upholstered element which is provided between the cover and the underlay, wherein the underlay, the coyer and/or the upholstered element are connected together by at least one longitudinal seam and at least one transverse seam. The present invention further relates to a method for the production of a seat cover as well as a vehicle seat comprising the seat cover according to the invention.

Generic vehicle seat covers are known from the prior art. Said seat covers, however, have the drawback that they do not have sufficient structure, do not provide the seat occupant with sufficient support and/or are too costly to produce.

It was, therefore, the object ox the present invention to provide a vehicle seat cover which does not have the drawbacks of the prior art.

The object is achieved by a vehicle seat cover comprising an underlay, a cover and an upholstered element which is provided between, the cover and the underlay, wherein the underlay, the cover and/or the upholstered element are connected together by at least one longitudinal seam and at least one transverse seam and the longitudinal seam has inwardly curved portions and/or outwardly curved portions.

The embodiments relating to this subject of the present invention apply equally to the other subjects of the invention and vice versa.

The present invention relates to a vehicle, seat cover which is arranged on a vehicle seat and which on one side is in direct contact with the seat occupant. The vehicle seat cover according to the invention may be provided both in the region of the backrest and in the seat part region of the vehicle seat. The vehicle seat may provide seating for one or more people. Accordingly, the vehicle seat may also be a seat bench. According to the invention, the vehicle seat cover has an underlay, for example a non-woven fabric and a cover, one surface thereof forming the visible face of the vehicle seat. An upholstered element, for example a foam upholstered element, is provided between the underlay and the cover. The underlay, the cover and/or the upholstered element are connected together by at least one longitudinal seam and at least one transverse seam. The longitudinal seam extends in the region of the backrest substantially parallel to the spinal column of the seat occupant and in the seat part region parallel to the thighs of the seat occupant. The transverse seams are in each case provided perpendicular thereto.

According to the invention, the longitudinal seam has inwardly curved portions and/or outwardly curved portion, quite particularly preferably the path thereof being provided to be zig-zag shaped. By means of the inwardly curved portions and/or outwardly curved portions, the structure of the seat cover is simplified/improved and at the same time the upholstered element is at least prefixed between the cover and the underlay.

According to a further subject or preferred subject of the present invention, the transverse seam is provided to be offset, over the width, of the vehicle seat cover. This embodiment according to the invention or preferred embodiment of the present invention has the advantage that the seat cover according to the invention may be produced in a particularly simple manner.

The embodiments relating to this subject of the present invention apply equally to the other subjects of the invention and vice versa.

According to a further subject or preferred subject of the present invention the upholstered element consists of a plurality of upholstered strips. Said upholstered strips are preferably arranged in parallel. They preferably have the same length and may have a variable width.

The embodiments relating to this subject of the present invention, apply equally to the other subjects of the invention and vice versa.

Preferably, the underlay is a non-woven material. Preferably the cover is leather.

A further subject of the present invention is a method for producing a vehicle seat cover comprising an Underlay and a cover, in which the cover is fastened to the underlay in order to produce undulations and then an upholstered element is provided between the underlay and the cover.

The embodiments relating to the vehicle seat cover apply equally to the method according to the invention and vice versa.

In the method according to the invention, the cover is fastened, in particular stitched to the underlay in order to produce undulations, and then the resulting pockets are filled with an upholstered element, in particular with upholstered strips.

Preferably the seam is a longitudinal seam. Quite particularly preferably, the longitudinal seam has inwardly curved portions and/or outwardly curved portions, i.e., it is not straight but preferably has a path which is zig-zag shaped.

Further preferably, the upholstered element, is provided to be strip-shaped, and in each case a strip is inserted into each pocket formed. As a result, a particularly well-structured vehicle seat cover is produced.

Preferably, at least one transverse seam is, subsequently provided, said transverse seam not following a straight path. Particularly preferably, said transverse seam is arranged in a step-shaped manner.

The inventions are described hereinafter with reference to FIGS. 1-10. Said descriptions are provided merely by way of example and do hot limit the general inventive idea. The descriptions apply equally to all subjects of the present invention.

Figure 1:
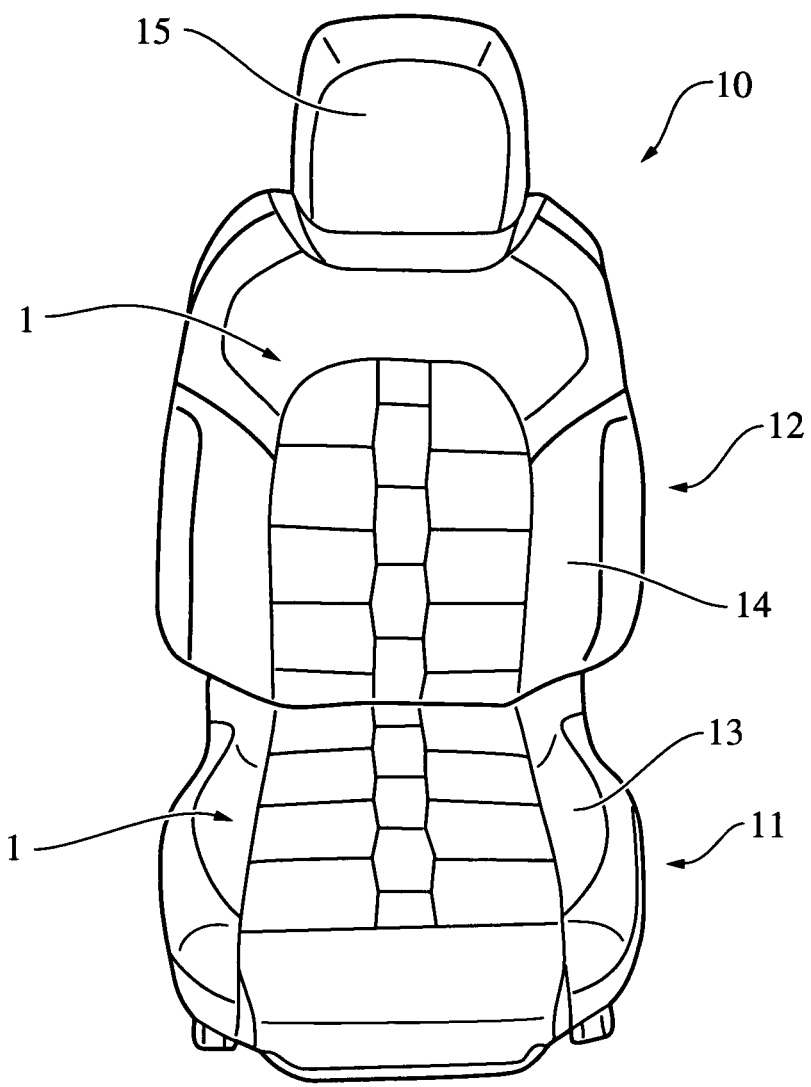
FIG. 1 shows the vehicle seat according to the invention.

FIG. 1 shows the vehicle seat 10 according to the invention. Said vehicle seat has a seat part 11 and a backrest 12, which is preferably rotatably provided on the seat part 11. A headrest is provided in the upper region of the backrest. Both the backrest 12 and, the seat part 11 have the vehicle seat cover 1 according to the invention. Said seat cover is surrounded by lateral upholstered elements 13, 14, both in the region of the seat part and in the region of the backrest. The vehicle seal cover 1 according to the invention has a structured surface which substantially consists of rectangular elements which are off set relative to one another. To this end, the seat cover according to the invention, bath in the region of the backrest and in the seat part region 4, in this case has longitudinal seams 5 which extend parallel to the spinal column and/or parallel to the thighs, and a plurality of transverse seams 6 which are preferably arranged perpendicular to the longitudinal seam 5. The vehicle seat cover according, to the invention consists of a cover 3 which is visible and an underlay 2, in particular a non-woven fabric, which is located below the cover 3 in the direction, of the structure of the vehicle seat. An upholstered element 1 is provided between the cover 1 and the underlay 2, said upholstered element preferably consisting of a plurality of upholstered strips which are preferably arranged parallel to the longitudinal seams.

Figure 2:
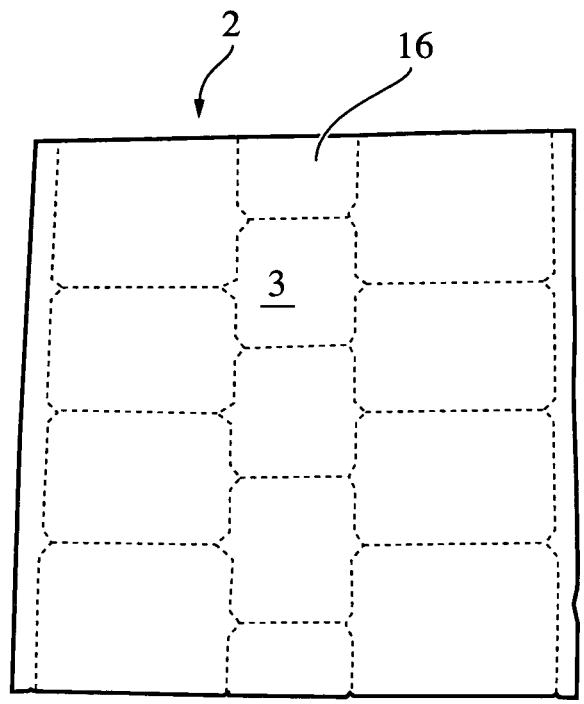
FIG. 2 shows the cover with, the path of the seam outlined.

FIG. 2 shows the underlay 2, in this case the non-woven, fabric, on which the cover 3 is arranged, said cover in this case being made of leather. The path of the seam 16 to be made on the leather is outlined.

Figure 3:
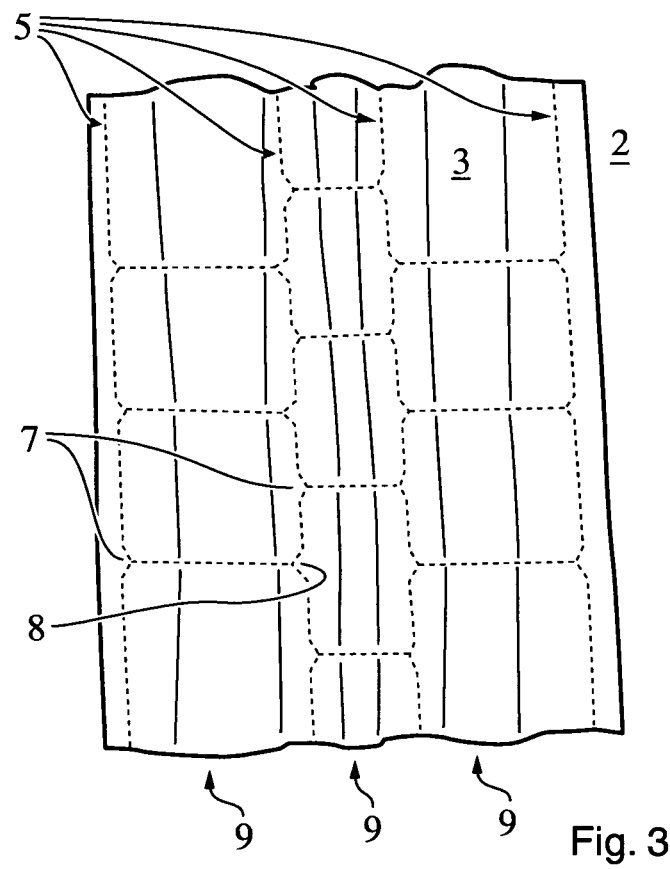
FIG. 3 shows the cover fastened to the underlay in order to produce undulations.

In FIG. 3, the cover 3 is fixed to the underlay 2 in order to produce undulations. Three pockets 9 are produced by means of the longitudinal seams 5, in this case four longitudinal seams, said pockets being subsequently filled with the upholstered element, in particular the upholstered strips 4. Both in FIG. 2 and in FIG. 3, it may be seen clearly that the longitudinal seams 5 do not run straight but have inwardly curved portions and/or outwardly curved portions. In each case, one of the adjacent pockets 9 in the inwardly curved portions and/or outwardly curved portions is slightly reduced in its cross section.

Figure 4:
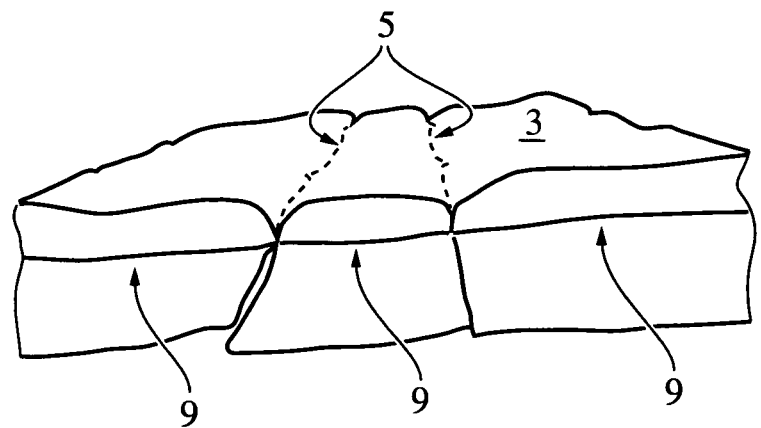
FIGS. 4 and 5 show the pockets or the seat cover according to the invention.
Figure 5:
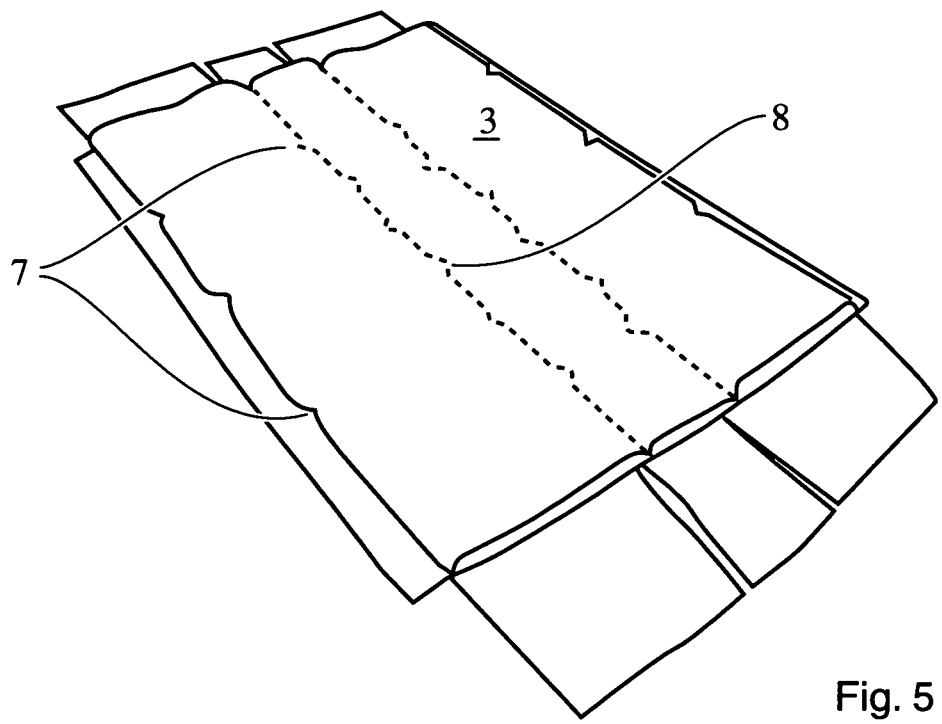

FIGS. 4 and 5 show the pockets 9 after the cover 3 has been fixed to the underlay 2 along the undulating longitudinal seams 5. Clearly visible are the inwardly curved portions and/or outwardly curved portions 7, 8. Said inwardly curved portion said/or outwardly curved portions serve for prefixing the upholstered strips, which are inserted into the pockets. Moreover, a particularly highly contoured vehicle seat cover is produced by the inwardly curved portions and/or outwardly curved portions.

Figure 6:
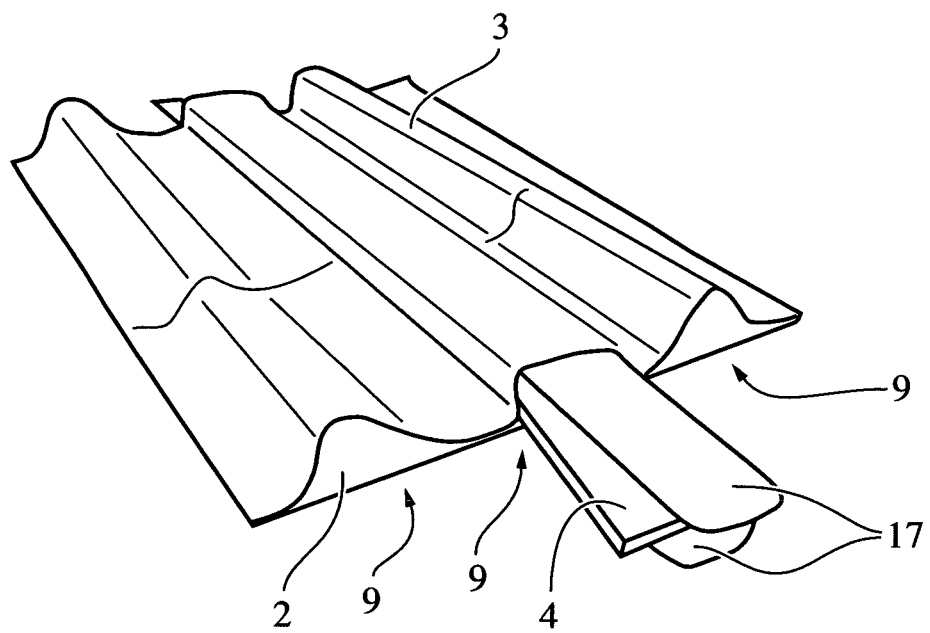
FIGS. 6 and 7 show the packets being filled with one respective upholstered strip.
Figure 7:
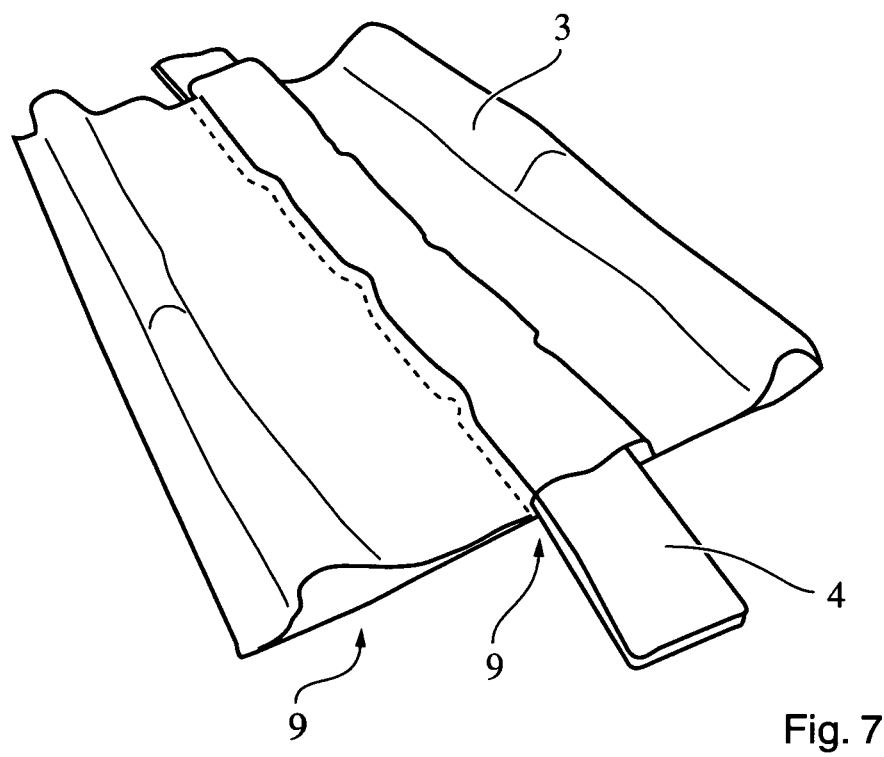

FIGS. 6 and 7 show the filling of the pockets 9 with the upholstered strips 4. Said upholstered strips are in the present case provided between two insertion aids 17, in this case two plates, and compressed therebetween and then introduced into the pockets. As soon as they have reached the desired position, the insertion aids 17 are removed from the pockets 9.

Figure 8:
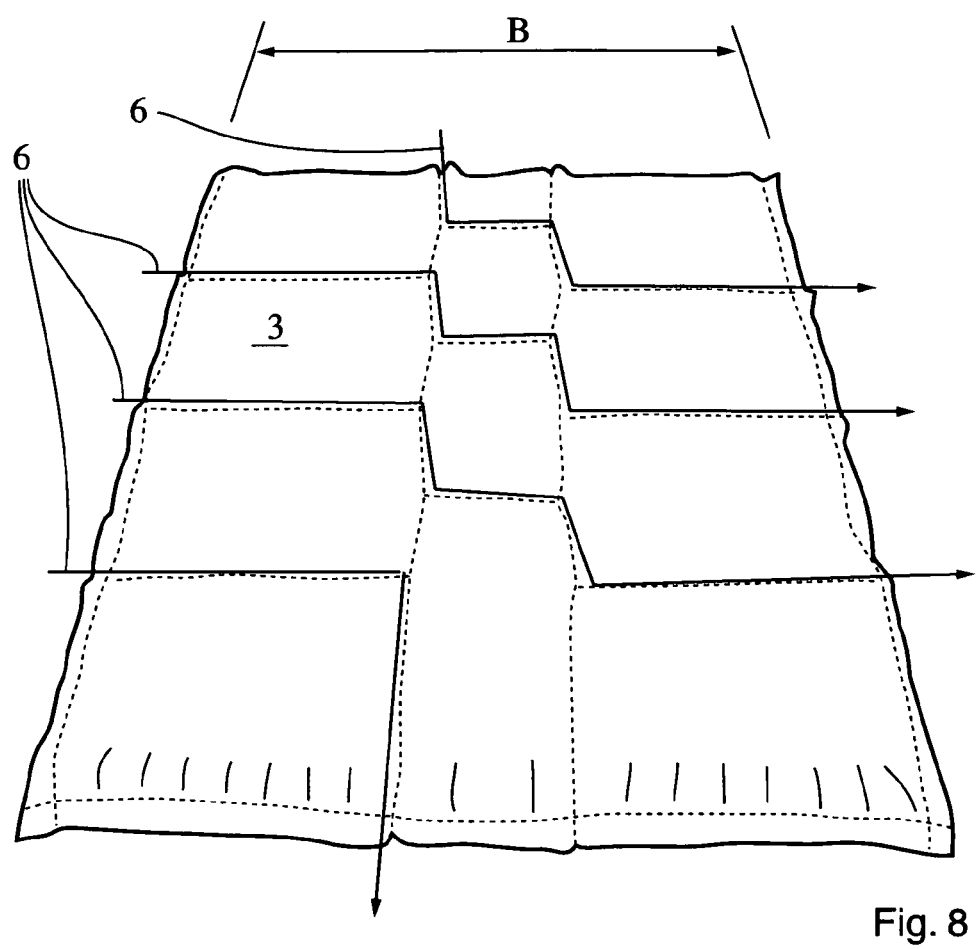
FIG. 8 shows the arrangement of the transverse seams.

FIG. 8 shows the strip-shaped upholstered element 4 in the pocket 9. The transverse seams 6 are arranged after all upholstered strips, in this case three upholstered strips, have been provided, in the pockets 9. The path of the respective transverse seam 6 is indicated by an arrow on the cover 3. It is clearly visible that a plurality or seams 6 extend over the entire width B of the seat cover and that they do not follow a straight path. In particular, at least one of the transverse seams is provided in a step-shaped manner.

Figure 9:
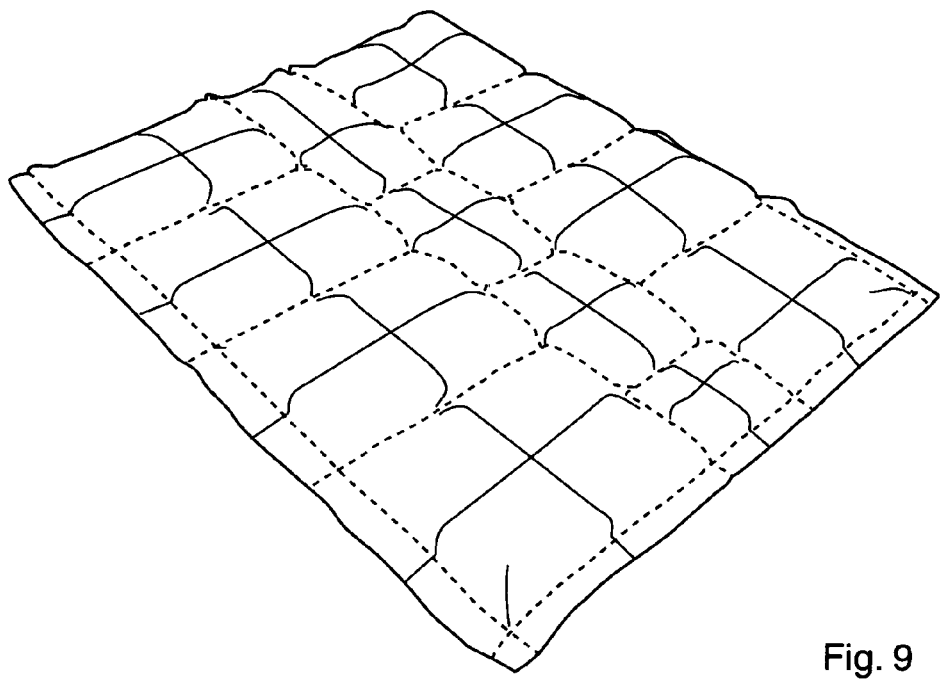
FIGS. 9 and 10 show the finished vehicle seat cover.
Figure 10:
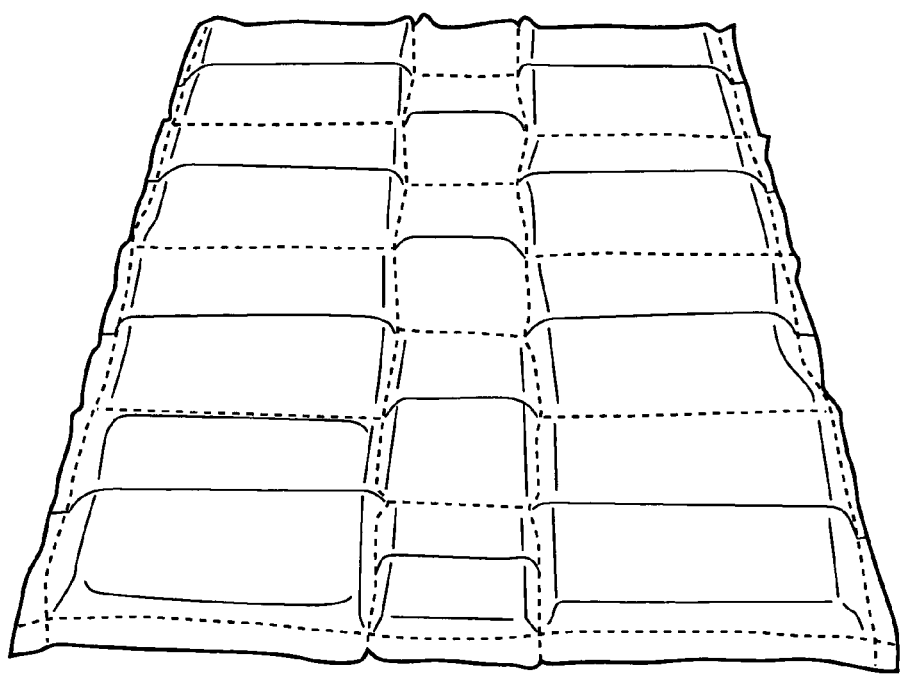

FIGS. 9 and 10 show the finished vehicle seat cover from the cover side (FIG. 9) and/or from the underside (FIG. 10). Said seat cover is then fastened to the vehicle seat and connected to the lateral upholstered elements and/or to the other cover regions, of the vehicle seat according to the invention surrounding the vehicle seat cover according to the invention.

LIST OF REFERENCE NUMERALS

1 Vehicle seat cover
2 Underlay, non-woven fabric
3 Cover
4 Upholstered element, upholstered strips
5 Longitudinal seam
6 Transverse seam
7 Inwardly curved portion
8 Outwardly curved portion
9 Pocket
10 Vehicle seat
11 Seat part
12 Backrest
13 Lateral upholstered element in seat region
14 Lateral upholstered element in backrest region
15 Headrest
16 Outline of the seams
17 Insertion aid
B Width of the seat cover

The invention claimed is:

1. A vehicle seat cover comprising an underlay, a cover and an upholstered element which is provided between the cover and the underlay, wherein the underlay, the cover and the upholstered element are connected together by a plurality of longitudinal seams and a plurality of transverse seams, wherein the plurality of longitudinal seams extend in a region of a backrest substantially parallel to a spinal column of a seat occupant and in a seat part region parallel to thighs of the seat occupant, wherein the plurality of transverse seams are arranged perpendicular to the plurality of longitudinal seams, wherein the upholstered element comprises a plurality of upholstered strips that are arranged parallel to the plurality of longitudinal seams, wherein the cover is fixed to the underlay by means of the plurality of longitudinal seams to produce undulations by which a plurality of pockets are formed, wherein at least one of the plurality of pockets is configured to be filled with at least one of the upholstered strips, wherein at least one of the plurality of longitudinal seams has inwardly curved portions and/or outwardly curved portions to form a zig-zag shaped path, wherein the inwardly curved portions and/or outwardly curved portions are configured to reduce the cross section of an adjacent pocket of the plurality of pockets, wherein the plurality of transverse seams are provided to extend over an entire width of the vehicle seat cover, and wherein the plurality of transverse seams are provided in a step-shaped manner.

2. The vehicle seat cover as claimed in claim 1 wherein the cover is leather and/or fabric.

3. A method for producing a vehicle seat cover comprising an underlay, a cover, and an upholstered element, wherein the cover is fastened to the underlay in order to produce undulations by a plurality of longitudinal seams to form pockets, wherein the plurality of longitudinal seams extend in a region of a backrest substantially parallel to a spinal column of a seat occupant and in a seat part region parallel to thighs of the seat occupant, wherein upholstered strips of the upholstered element are provided between the underlay and the cover in the pockets and are arranged parallel to the plurality of longitudinal seams, wherein at least one of the plurality of longitudinal seams has inwardly curved portions and/or outwardly curved portions to form a zig-zag shaped path, wherein the inwardly curved portions and/or outwardly curved portions are configured in such a manner as to reduce the cross section of an adjacent pocket of the plurality of the pockets, wherein a plurality of transverse seams are provided and the plurality of transverse seams are arranged perpendicular to the plurality of longitudinal seams, wherein the plurality of transverse seams are provided to extend over an entire width of the vehicle seat cover, and wherein the plurality of transverse seams are arranged in a step-shaped manner.

4. The method as claimed in claim 3, wherein the cover is fastened to the underlay by securely stitching the cover to the underlay by a longitudinal seam.

5. The method as claimed in claim 3 wherein the upholstered element is provided to be strip-shaped.

6. A vehicle seat, comprising:
a vehicle seat cover comprising an underlay, a cover, and an upholstered element which is provided between the cover and the underlay, wherein the underlay, the cover, and the upholstered element are connected by a plurality of longitudinal seams and a plurality of transverse seams, wherein the plurality of longitudinal seams extend in a region of a backrest substantially parallel to a spinal column of a seat occupant and in a seat part region parallel to thighs of the seat occupant, wherein the plurality of transverse seams are arranged perpendicular to the plurality of longitudinal seams, wherein the upholstered element comprises a plurality of upholstered strips that are arranged parallel to the plurality of longitudinal seams, wherein the cover is fixed to the underlay by means of the plurality of the longitudinal seams to produce undulations by which a plurality of pockets is formed, wherein at least one of the plurality of the pockets is configured to be filled with at least one of the upholstered strips, wherein at least one of the plurality of longitudinal seams has inwardly curved portions and/or outwardly curved portions to form a zig-zag shaped path, wherein the inwardly curved portions and/or outwardly curved portions are configured to reduce the cross section of an adjacent pocket of the plurality of pockets, wherein the plurality of transverse seams are provided to extend over an entire width of the vehicle seat cover, and wherein the plurality of transverse seams are provided in a step-shaped manner.

\* \* \* \* \*